United States Patent [19]

Clayton et al.

[11] Patent Number: 4,766,484

[45] Date of Patent: Aug. 23, 1988

[54] NTSC/PAL SWITCHABLE VIDEO COLOR DECODER USING A DIGITAL COMB FILTER AND METHOD

[75] Inventors: John C. Clayton, Harrow Weald; Trevor J. Barnes, Woking, both of England

[73] Assignee: Avesco p.l.c., Chessington, England

[21] Appl. No.: 35,446

[22] Filed: Apr. 7, 1987

[30] Foreign Application Priority Data

Apr. 11, 1986 [GB] United Kingdom ............... 8608811

[51] Int. Cl.$^4$ .................... H04N 9/78; H04N 9/66
[52] U.S. Cl. .................................... 358/23; 358/31
[58] Field of Search .................... 358/21 R, 23, 31

[56] References Cited

U.S. PATENT DOCUMENTS

| 3,872,498 | 3/1975 | Pritchard | 358/31 |
| 4,050,084 | 9/1977 | Rossi | 358/31 |
| 4,241,363 | 12/1980 | Maeyama et al. | 358/31 |
| 4,464,675 | 8/1984 | Balaban et al. | 358/31 |

FOREIGN PATENT DOCUMENTS

| 117329 | 10/1978 | Japan | 358/31 |
| 94893 | 7/1981 | Japan | 358/31 |
| 158187 | 9/1984 | Japan | 358/31 |
| 74893 | 4/1985 | Japan | 358/23 |
| 96982 | 5/1985 | Japan | 358/23 |
| 2050110 | 12/1980 | United Kingdom | 358/31 |
| 2066615 | 7/1981 | United Kingdom | 358/31 |
| 1480516 | 7/1987 | United Kingdom | |

Primary Examiner—John W. Shepperd
Attorney, Agent, or Firm—Olson & Hierl

[57] ABSTRACT

Apparatus for and a method of decoding a video color signal provides a digital wide band luminance signal. An analog signal V1 representing the low band luminance component of a coded video color input signal Icv, is obtained at a first analog filter 1. An analog signal Yhc representing high band luminance and chrominance components is obtained at second means (5) which subtracts the first analog signal Y1 from a delayed input signal Icv. Signal Yhc is synchronously demodulated to provide (B-Y) and (R-Y) chrominance component signals $U_1$, $V_1$, which are digitized. Via digital delay means, single line delayed signals Yd1, $U_0$, $V_0$ and double line delayed signals $U_{-1}$, $V_{-1}$ are obtained. High band luminance signals Yu, Yv are then obtained as a function of at least two of the respective chrominance component signals $U_1$, $U_0$ and $U_{-1}$; and $V_{-1}$, $V_0$ and $V_{-1}$. These signals Yu, Yv are remodulated and combined to provide a digital high band luminance component signal Yh. Finally, by digitally summing the digital signals Yd1 and Yh a digital wide band luminance output signal Yd is obtained. Two different functions for obtaining the high band luminance components are exemplified. Wideband chrominance signals are also provided.

9 Claims, 2 Drawing Sheets

U and V aperture function.

U → V, V → U crosstalk coefficients.

A four-line PAL axis sequence.

NTSC/PAL SWITCHABLE VIDEO COLOR DECODER USING A DIGITAL COMB FILTER AND METHOD

This invention relates to a video colour decoder using a digital comb filter capable of, and method for, processing signals of more than one television standard to provide a digital wide band luminance output signal.

In an embodiment, reference is made to the use of the digital luminance and chrominance signals from this decoder in apparatus having a four field frame store to provide especially advantageous techniques for motion detection and adaptive line interpolation.

BACKGROUND

Television signals are currently broadcast and distributed mostly in 'coded' form, that is to say that the original colour picture comprising red, green and blue component signals has been encoded into a single composite signal in accordance with the standards of the PAL, NTSC or SECAM systems, or their variants.

These systems were evolved largely on the basis of broadcast requirements, and their characteristics were determined by such considerations as compatability with existing monochrome broadcast formats. Consequently, there are aspects of these systems which do not ideally suit the studio environment, where the video signal may be processed by a long chain of equipment and the main requirement is that minimal cumulative degradation takes place. As much of this equipment is now using digital storage and processing techniques, it is appropriate that new video standards have been introduced which operate in the 'component' domain, that is 'RGB' (red, green, blue) or 'YUV' (matrixed RGB, being the three signals derived for use in the 'coded' systems), the video signal being transferred between items of equipment in digital P.C.M. form. There is therefore a need for an interface between the coded analog and a component environment to allow conventional analog signals to be further processed in component form.

Although this interface has obviously existed for as long a time as the coded system itself, (for example, in a colour television receiver where RGB signals are utlimately required for display), there are several levels of refinement associated with the decoding process, the more sophisticated decoding techniques being devised in an attempt to remove the degradations introduced into the decoded component signals as a result of the compromises inherent in coded signal standard itself. One of the major compromises associated with all existing coded formats is the requirement that the coded colour signal is contained within a bandwidth no greater than the corresponding monochrome standard, this being achieved by modulating the colour information (the U and V components) onto a subcarrier situated towards the top of the video bandwidth. This shared bandwidth leads to crosstalk between the signal components, the exact nature of the crosstalk being characteristic of the coded system in use.

These effects are generally refered to as cross-colour and cross-luminance, an example being the appearance of coloured fringes in areas containing high-frequency picture detail (cross-colour).

The simplest form of decoder attempts to separate the luminance and chrominance signal components purely on the basis of their predominant frequency bands, the luminance information being regarded as occupying the lower part of the spectrum and the chrominance the upper part, and this technique is basically that applied in the domestic TV set, where the above effects may be observed.

The more sophisticated systems apply analog comb filter techniques to separate the luminance and chrominance components, the difficulty of separating signals occupying the same parts of the spectrum being overcome by exploiting the redundancy of information contained in a video signal when several neighbouring scan lines contain very similar information. It must be emphasised that this assumption is fundamental to the operation of line-based comb filters, as information theory shows that in the general case, the extra chrominance information cannot be introduced as an independent signal, without the occurence of crosstalk.

EXISTING ANALOG COMB FILTER DESIGNS

There is a well-documented history of the development of PAL analog comb-filter decoders which operate in the coded signal domain. These generally operate using a three-line 'aperture' meaning that three consecutive lines of video are processed in such a way as to produce separated luminance and chrominance signals which are as close as possible to those which are originally coded onto the centre line signal. The derivation of the processing methods rests on the frequency relationship between the chrominance subcarrier frequency and the line frequency as defined in the NTSC and PAL systems, no comb filering of SECAM signals is possible.

Several PAL analog comb-filer decoders are described in an article entitled Comb Filter PAL Decoders in the March 1984 issue of "International Broadcast Engineer" magazine and an earlier system is described in article entitled PAL Colour Picture Improvement Using Simple Analog Comb Filters in Vol. 87 (October 1978) of the SMPTE Journal.

Although the systems described in these articles can give good results, there are several respects in which an alternative approach is desirable:

(a) In order to gain simultaneous access to the three lines of video for processing, an input signal must be passed through two delays each of exactly one line period (or as precisely required by the particular design). This is generally achieved by the use of glass delay lines, or more latterly charge-coupled devices, neither of which possess entirely satisfactory characteristics. In particular, the glass delays tend to have a dependence of delay and other parameters on temperature, exhibt multiple reflections and have to be driven by a signal modulated onto a carrier which then must be demodulated after amplification at the receiving end.

As the centre line of the three has been once delayed, the main signal path suffers the degradation associated with the passage through the filter performance may be difficult to maintain over a period of time.

(b) As may be judged by the descriptions of the existing designs, there is considerable analog processing devoted to filtering and matching various signal paths to achieve comb filter operation. This demands a lengthy set-up procedure and great stability in the analog circuitry and would present a considerable challenge in trying to achieve a system capable of comb-filtering both NTSC and PAL signals, where the phase relationships and line periods are both different.

(c) It is generally recognised that where signals are to be delayed by a substantial period, the preferred method is a digital process, this being particularly desirable when the analog signal has to be digitalised in any case for subsequent storage in a digital frame store. As digital devices have come cheaper and more complex, digital signal processing has also become more attractive in relation to the equivalent analog methods, major advantages being ease of automatic testing and fault location, minimal set-up effort and long-term stability. There is an additional advantage in relation to the proposed application in that the delay required for the NTSC and PAL comb filters can be precisely obtained by virtue of the number of clock periods assigned to the line periods of the two systems.

According to the present invention there is provided a video colour decoder using a digital comb filter, comprising first means for deriving a first analog signal Y1 representing low band luminance component of a video colour input signal Icv;

second means for deriving a second analog signal Yhc representing high band luminance and chrominance components of the video colour input signal Icv;

third means to enable synchronous demodulation of the second analog signal Yhc to provide a B-Y chrominance component signal $U_1$ and an R-Y chrominance component signal $V_1$ (where B and R is the conventional notation for the respective RGB component signals);

first analog to digital converter (ADC) means for digitising the first analog signal Y1 to produce the equivalent digital signal Yd1;

second analog to digital converter (ADC) means for digitising the (B-Y) and (R-Y) chrominance component signals $U_1V_1$;

first digital delay means for providing a single line delay of the first digital signal Yd1;

second digital delays means for providing a single line delay of the chrominance component signals $U_1V_1$ with a delay period of one line, the chrominance component signals so delayed by one line period being designated $U_0, V_0$; third digital delay means for providing a further single line delay of the chrominance signals $U_0, V_0$ with a further delay period of one line, the chrominance component signals so delayed by one further line period being designated $U_{-1}, V_{-1}$;

summing means arranged to reject consistent chrominance information and operable to provide a high band luminance signal Yu as a function of at least two of the respective chrominance component signals $U_1, U_0$ and $U_{-1}$;

summing means arranged to reject consistent chrominance information and operable to provide a high band luminance signal Yv as a function of at least two of the respective chrominance component signals $V_1, V_0$ and $V_{-1}$;

means for generating digital sinewave and cosinewave reference signals Uref, Vref representing the sine wave of the coded (B-Y) subcarrier reference phase signal and the cosinewave of the coded (R-Y) subcarrier reference phase signal;

digital means for obtaining the products of the signals Yu,Yv and their respective sinewave and cosinewave reference signals Uref,Vref;

means for summing these products to provide a digital high band luminance component signal Yh;

and digital means for summing the digital signal Yd1 and the digital signal Yh to provide a digital wide band luminance output signal Yd.

In a preferred embodiment said digital high band luminance signals (Yu,Yv) are obtained as a function of the respective chrominance component signals of three video lines represented by the undelayed chrominance components ($U_1, V_1$) the one line delayed chrominance components $U_0, V_0$ and the two line delayed chrominance components ($U_{-1}, V_{-1}$): said function requiring half the sum of the undelayed chrominance component signals ($U_1, V_1$) and the twice delayed chrominance component signals ($U_{-1}, V_{-1}$) to be subtracted from the once delayed chrominance component signals ($U_0, V_0$). This embodiment is employed to process signals of more than one television standard, namely the NTSC and PAL standards.

In the preferred embodiment the decoder receives an input signal selected from the NTSC and PAL video signal systems, and said first and second means for deriving said first and second analog signals Y1 and Yhc are switchable for operation in the respective NTSC and PAL mode.

In the preferred embodiment there is provided an automatic gain control (AGC) loop with the third means and to provide signal scaling means (receiving a signal representing an inversion of gain in AGC loop) for scaling the digitised high band luminance frequency signal Yh.

It is a preferred feature to provide means for detecting residual chrominance components in the high band luminance signal Yh and comparing these residual components with two threshold levels, said detecting means being operable to generate a control signal for controlling a data selector, said data selector being capable of operation on the high band luminance signal Yh in one of three modes, said data selector being operable in a first said mode to pass this luminance signal, said data selector being operable in a second said mode to halve the amplitude of this luminance signal, said data selector being operable in said third said mode to suppress this luminance signal; said first mode corresponding to those residual components being below the first threshold, said second mode corresponding to those residual components being between the thresholds, and said third mode corresponding to those residual components being above the second threshold.

In a modified embodiment which is used as an alternative mode of processing PAL system input signals said digital high band luminance signals (Yu,Yv) are obtained as a function of the respective chrominance component signals of two video lines represented by the undelayed chrominance components ($U_1, V_1$) and the two line delayed chrominance components ($U_{-1}, V_{-1}$); said function requiring half the difference of the twice delayed chrominance component signals ($U_{-1}, V_{-1}$) and the undelayed chrominance component signals ($U_1, V_1$).

According to a further aspect of the present invention there is provided a method of decoding a video colour signal to provide a digital wide band luminance signal comprising the steps of:

(a) deriving a first analog signal Y1 representing low band luminance component of a video colour input signal Icv, by passing the video colour input signal Icv through a first analog filter means;

(b) deriving a second analog signal Yhc representing high band luminance and chrominance components of the video colour input signal Icv by passing the colour input signal Icv through second means which subtracts the first analog signal Y1 from a correspondingly delayed input signal Icv;

(c) synchronously demodulating the second analog signal Yhc to provide a (B-Y) chrominance component signal $U_1$ and an (R-Y) chrominance component signal $V_1$ (where B and R is the conventional notation for the respective RGB component signals);

(d) employing first analog to digital converter (ADC) means to digitise the first analog signal Y1 thereby to produce the equivalent digital signal Yd1;

(e) employing second analog to digital converter (ADC) means to digitise the (B-Y) and (R-Y) chrominance component signals $U_1, V_1$;

(f) employing first digital delay means to provide a single line delay of the first digital signal Yd1;

(g) employing digital delay means to provide a single line delay of the chrominance component signals $U_1$, $V_1$ with a delay period of one line, the chrominance component signals so delayed by one line period being designated $U_0, V_0$;

(h) employing third digital delay means to provide a further single line delay of the chrominance signals $U_0, V_0$ with a further delay period of one line, the chrominance component signals so delayed by one further line period being designated $U_{-1}, V_{-1}$;

(i) employing summing means arranged to reject consistent chrominance information and operable to provide a high band luminance signal Yu as a function of at least two of the respective chrominance component signals $U_1, U_0$ and $U_{-1}$;

(j) employing summing means arranged to reject consistant chrominance information and operable to provide a high band luminance signal Yv as a function of at least two of the respective chrominance component signals $V_1, V_0$ and $V_{-1}$;

(k) generating digital sinewave and cosinewave reference signals Uref, Vref representing the sine wave of the coded (B-Y) subcarrier reference phase signal and the cosine wave of the coded (R-Y) subcarrier reference phase signal;

(l) obtaining the products of the signals Yu,Yv and their respective sinewave and cosinewave reference signals Uref,Vref;

(m) summing these products to provide a digital high band luminance component signal Yh;

(n) and, digitally summing the digital signal Yd1 and the digital signal Yh to provide a digital wide band luminance output signal Yd.

In a preferred method in steps (i) and (j) said digital high band luminance signals (Yu,Yv) are obtained as a function of the respective chrominance component signals of three video lines represented by the undelayed chrominance component $(U_1, V_1)$ the one line delayed chrominance components $U_0, V_0$ and the two line delayed chrominance components $(U_{-1}, V_{-1})$; said function requiring half the sum of the undelayed chrominance component signals $(U_1, V_1)$ and the twice delayed chrominance component signals $(U_{-1}, V_{-1})$ to be subtracted from the once delayed chrominance component signals $(U_0, V_0)$.

Alternatively for processing PAL signals, in steps (i) and (j) said digital high band luminance signals (Yu,Yv) are obtained as a function of the respective chrominance component signals of two video lines represented by the undelayed chrominance components $(U_1,V_1)$ and the two line delayed chrominance components $(U_{-1},V_{-1})$; said function requiring half the difference of the twice delayed chrominance component signals $(U_{-1},V_{-1})$ and the undelayed chrominance component signals $(U_1,V_1)$.

Embodiments of the invention will now be described, by way of example only, with reference to the accompanying drawings, in which.

DESCRIPTION OF PREFERRED EMBODIMENT

Figure 1:
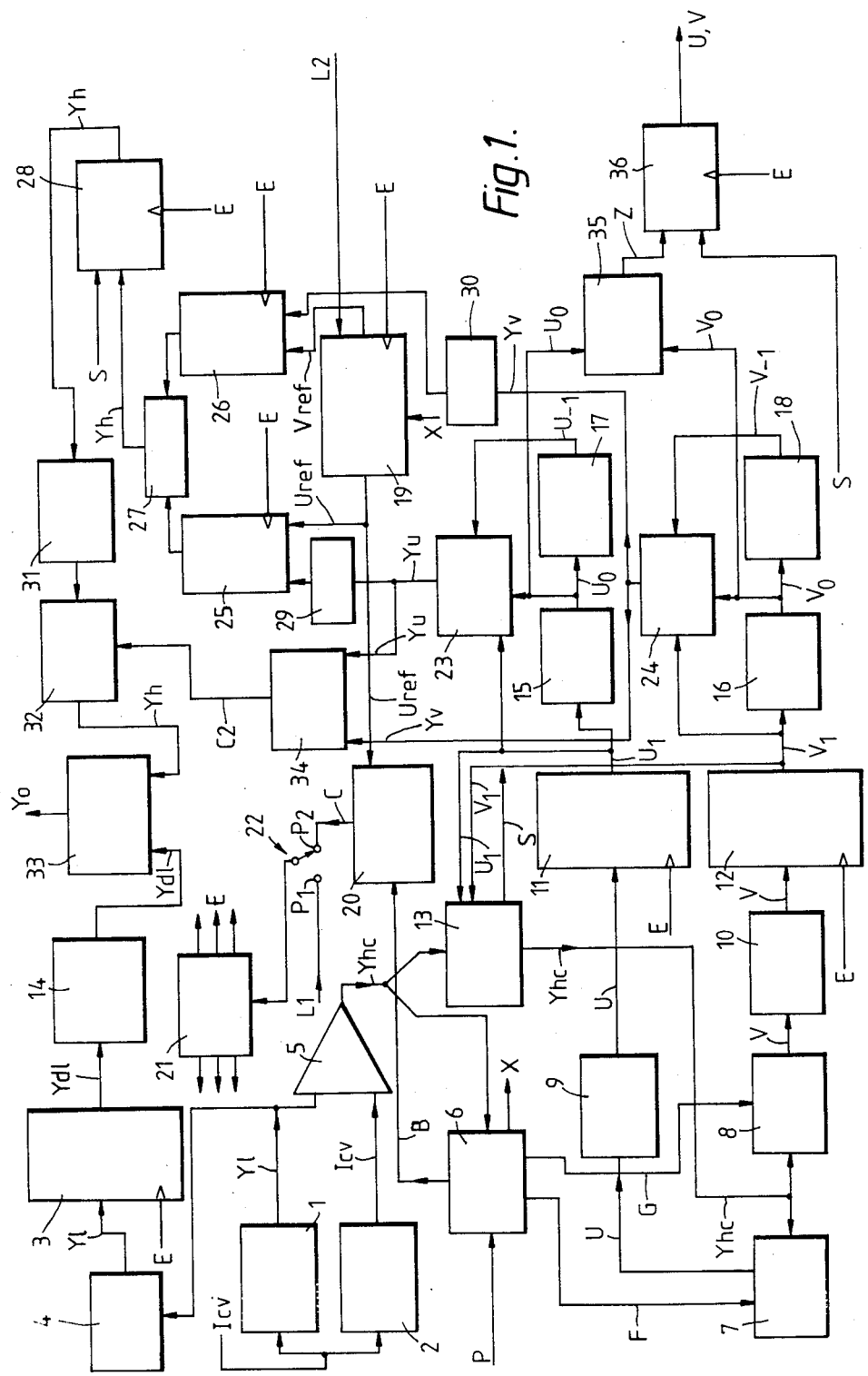
FIG. 1 shows schematically the circuit for the decoder.

Referring to FIG. 1, there is shown schematically a circuit for a video colour decodeer. A PAL or NTSC coded video colour signal Icv (which has already been band-limited to exclude out-of-band noise) is passed through a phase-compensated low-pass filter, the cut-off frequency of which is chosen to divide the video spectrum into the predominant regions of luminance and chrominance energy. As the PAL and NTSC systems use differing subcarrier frequencies, it is necessary to use a cut-off frequency suited to each system in two switchable filters.

The input signal Icv is also passed through a wide-band analog delay line 2 which has a delay equal to the delay of the low-pass filter 1. As the NTSC filter exhibits a greater delay than the PAL filter, an extra compensating (analog) delay must be introduced in delay line 2 when operating the the NTSC mode.

The output signal Y1, which represents the low band luminance component of signal Icv, of the low-pass filter 1 contains the lower frequency part of the luminance spectrum and very little chrominance information. This signal Y1 is digitised at an analog to digital converter (ADC) 3 into 8-bit PCM form. Prior to digitising, signal Y1 has been subjected to a small analog delay at a compensating analog delay Trim 4. This additional delay at analog delay trim 4 is necessary in order that the delay of the luminance signal Y1 will match the exact delay in chrominance channels U, V (to be described), as subsequent digital delays can only introduce delays which are integer multiples of the 13.5 MHz sampling period.

Signal Y1 from filter 1 and signal Icv from delay line 2 are input to a differential amplifier 5 where they are subtracted to produce a signal Yhc. This signal Yhc represents that part of the spectrum of signal Ivc which is complementary to signal Y1 and which contains the chrominance and high-frequency luminance information. It may be seen at this stage that, adding this signal Yhc to the output signal Y1 of the low-pass filter 1, reproduces the original full-band coded signal Icv.

The output signal Vhc from the differential amplifier 5 is used to feed a burst-locked oscillator 6 and synchronous demodulators 7,8 forming an NTSC or 'simple' PAL decoder. As will be appreciated by those skilled in the art, oscillator 6 comprises quad oscillators at the PAL or NTSC subcarrier frequencies of 4.43 MHz or 3.58 MHz. Signal Yhc from amplifier 5 is input to oscillator 6 and employed as a gated reference burst signal. Likewise oscillator 6 outputs a burst locked reference signal B. Synchronous demodulation is obtained by using four times subcarrier frequency reference oscillators (with digital division to reduce set-up effort) to output reference signals F and G for the (B-Y) and (R-Y) demodulators 7, 8. A system microprocessor (not shown) is employed to generate a digital phase control signal P whereby the signal phase is corrected to obtain correct decoder reference axes F, G in all modes of operation of the system. The system microprocessor is employed to facilitate switching between the PAL and NTSC modes of the decoder by means of signal X.

When operating in PAL mode, the R-Y reference axis is switched in sympathy with the burst phase. Signals U and V representing the R-Y and B-Y outputs from demodulators 7,8 are filtered at low-pass filters 9,10 to remove the high-order demodulation components. These B-Y and R-Y signals U, V are then digitised in analog to digital converters (ADC) 11, 12, each operating as 8-bit ADCs at the same sampling rate as the luminance channel (13.5 MHz) to provide signals $U_1$, $V_1$.

Prior to demodulation, the 'highband' signal Vhc is passed through a highband automatic gain-controlled (AGC) amplifier 13. The gain control signal for the AGC amplifier 13 is derived from ADC's 11,12. This use of the digitised R-Y and B-Y signals $U_1$, $V_1$ establishes an AGC loop. This system allows optimum resolution to be obtained in the high-band channel under typical signal conditions while allowing high chrominance amplitudes, such as 100% colour bars to be handled. The original signal amplitude can subsequently be re-established by multiplication by a scaling factor S, which is derived in the AGC loop by a measurement of the reciprocal of the gain at amplifier 13. This value is digitised to an unsigned 8-bit value in a slow ADC (not shown). The AGC system allows the gain to be increased to twice that value appropriate for 100% colour bars.

The digitised R-Y and B-Y signals $U_1$ and $V_1$ from ADC's 11, 12 are delayed digitally at digital delay lines 15, 16 by one line period to obtain a 'centre' line signals $U_0$, $V_0$ and further delayed digitally at digital delay lines 17, 18 by another period of one line to provide third line signals $U_{-1}$, $V_{-1}$ for a processing aperture. Likewise, the digitised signal Yd1 from ADC 3 is delayed at digital delay line 14 by one line period. This contributes to a centre line low-band luminance. signal $Y_0$.

For the purposes of arithmetic processing:
Let the undelayed B-Y signal be represented as $U_1$
Let the undelayed R-Y signal be represented as $V_1$
Let the once-delayed B-Y signal be represented as $U_0$
Let the once-delayed R-Y signal be represented as $V_0$
Let the twice-delayed B-Y signal be represented as $U_{-1}$
Let the twice-delayed R-Y signal be represented as $V_{-1}$
Let the once-delayed Y signal be represented as $Y_0$ Processing is provided at summing untis 23 and 24 to derive digital highband luminance signals Yu and Yv. The processing gives a signal:

$$Yu = U_0 - (U_{-1} + U_1)/2$$

and $$Yv = V_0 - (V_{-1} + V_1)/2.$$

A generator 19 is provided for generating sine and cosine signals Uref, Vref corresponding to the B-Y and R-Y reference axes. It comprises a pair of 2K×12 bit ROMs and it receives signal L2 comprising addresses from a counter system generated at system sample rate. A phase comparator 20 locks the B-Y axis frequency and phase signal Uref so derived from generator 19 to that of the burst-locked reference oscillator 6 from which it receives the burst locked reference signal B. Phase comparator 20 then controls the frequency of the video clock output (EBU clock) VCO 21 generating the 13.5 MHz sample rate, signal E. This enables the line delays at delays 15-18 to be controlled very accurately since locking the sample rate to the subcarrier frequency rather than line frequency, gives far greater stability, particularly when locking to a noisy input signal.

Line phase locking of all timing signals is, however, still required. Initially this is achieved by allowing the 13.5 MHz VCO 21 to be controlled by a signal L1 from a line phase comparator (not shown). Initially, a switch 22 is set to its first position P1 which couples the line phase comparator signal L1 with the VCO 21 and initiates line phase locking in the P1 position. When this line phase lock is achieved, the subcarrier frequency locking mode (previously described) is entered by placing the switch 22 in the P2 position. When in this mode, very fine line phase adjustments may be made. This is achieved by inputting a signal L2 representing 'fine line phase adjustment' to generator 19. In practice this involves altering address increments, made to the look-up ROM's contained within generator 19, for a period in order to alter the phase of the sine waves relative to the line phase. Since these synthesised reference signals are locked to the reference subcarrier, the line phase must change. This is done automatically to maintain lock, by using a signal L2 derived from the line phase comparator (not shown) which causes a small phase adjustment to be made, if necessary, at the start of each field based on an averged line phase measurement made during the previous field. If the line phase error exceeds a preset limit, however, the lock mode reverts to simple line phase control until the error has been brought within this limit, whereupon fine control is re-established.

The digital value representing the instantaneous value of the B-Y reference sinewave Uref. is multiplied at multiplier 25 by the quantity:

$$Yu = U_0 - (U_{-1} + U_1)/2$$

and the corresponding digital value of the R-Y reference sinewave Vref. is multiplied at multiplier 26 by the quantity:

$$Yv = V_0 - (V_{-1} + V_1)/2.$$

Multipliers 25, 26 are two 12×12 bit signed multipliers. The products of the operations in multipliers 25, 26 are summed in unit 27. It may be easily seen that, if the three lines in the aperture contain the same Y, U, V component information prior to coding, then the signals from multipliers 25, 26 will contain no U or V components. In the event the sum of the contributions from the outer two lines (U1, U-1) (V1, V-1), resulting from the presence of high-band luminance, will cancel leaving only the contribution (U,V) from the centre line itself. The overall process them simplifies to one of 'demodulating' all high-band Y information in terms of two orthogonal decoding axes, Uref, Vre, and subsequently 'remodulating', this time digitally, upon the two same axes, using the multipliers 25, 26. It may be shown that the signal so reconstructed is the high-band luminance signal Yh, but with all consistent chrominance information removed.

In the case of NTSC, the net contribution from the U and V components is still zero, but further analysis shows that high-band luminance Yh is contributed from all three lines, resulting in a doubling of the reconstructed high-band luminance amplitude. Compensating divide-by-2 circuits 29,30 are inserted at the points shown when operating in NTSC mode.

The resulting high-band luminance signal Yh, in either mode, is rescaled in a third multiplier 28 to compensate for the input AGC system: the scaling input level signal for multiplier 28 is obtained from the AGC amplifier 13 (as previously mentioned). The signal is then passed through a data selector 32. Selector 32 can (a) pass the signal unchanged, (b) pass the signal shifted down one bit, i.e. at a gain of one half, or (c) pass a zero output. Following selector 32, the Yh signal passes to unit 33 where it is finally added back into the similarly delayed low-band luminance signal Yl to obtain a wideband comb-filtered luminance signal Y, with a controllable proportion of the high-band range present.

By using the scaling signal S the chrominance signals $U_0$ and $V_0$ (one line delayed) from digital delay means 15, 16 are digitally combined at multiplexer 35 to give signal Z. Signal Z is rescaled at multiplier 36 to provide the chrominance signal for subsequent processing (e.g. motion detection and standards conversion by way of adaptive interpolation). Multiplier 36 (like multiplier 28 for the luminance signal) receives a level scaling signal S which is derived from the amplifier 13 in the input AGC loop, for rescaling the chrominance signal.

Reference has been made to adaptation of the system as between NTSC of PAL input signals, e.g. at filter 1, wide band delay 2, burst locked oscillator 6 and compensating divide-by-two circuits 29, 30. By these means, processing for NTSC or PAL video signals can be readily selected.

It will be appreciated that the comb filter decoder described with reference to FIG. 1 may form the first stage of apparatus for digitally processing video signals. In particular it is advantageously incorporated in apparatus which includes a frame store for four fields. Reference will be made below to the advantageous manner in which the digital luminance signal Y and chrominance signal U, V outputs from this decoder may be employed in motion detection and in adaptive interpolation (e.g. for standards conversion) in apparatus using a four field store.

Analyses of the performance of the system when presented with dissimilar information over the three-line aperture must take into account the effects of differing luminance and chrominance components.

A. Differing Luminance (Y) Components

In the NTSC mode, the high band Y may be shown to be constructed from contributions of 25%, 50%, 25% across the three-line aperture. This is equivalent to typical analog designs and exhibits some zeroes when processing certain high diagonal frequencies (e.g. a frequency which shifts its phase by 180 degrees from one scan line to the next).

In the first PAL mode, the contributions from the outer lines to high-band Y may be shown to undergo a transformation equivalent to that produced by the 'PAL modifier' system described in the previously mentioned prior art references. The net result is that the interfering 'alias' signals reverse their phase every two fields, which implies that if the wideband Y signal could be averaged over two fields of the same type, the aliases would cancel leaving only the original Y signal presented to the PAL coder (i.e. perfect comb filtering).

The above-described decoder is to be incorporated in apparatus providing a frame store for four fields. When using four fields of storage, it is possible to exploit this characteristic (for the elimination of aliases). This is implemented by ensuring that, when processing stationary pictures, equal contributions to a particular picture line are received from two consecutive frames.

This requires that a motion detection system be used to allow adaptive data manipulation.

B. Differing Chrominance (U,V) Components

If the coded U, V information is substantially different over the three lines, the cancellation of the U, V contributions to the bracketed quantities will fail, just as is the case with the analog design configurations. The occurrence of this may be detected by passing these Signals U, V (from units 23, 24) through unit 34. Unit 34 firstly comprises low-pass filters (averagers) to remove the effect of high luminance frequencies, (other than those very close to subcarrier frequency). Unit 34 further comprises comparator means for assessing the absolute value of the residual chrominance signals against two thresholds. These comparator means within unit 34 provide a control signal C2 to data selector 32. This control signal C2, in response to the residual chrominance signals (U,V) exceeding a first lower threshold, will switch data selector 32 to the $\times \frac{1}{2}$ mode and will cause the recombination of Yh to occur at half the normal gain level. Likewise, this control signal in response to the residual chrominance signal (U,V) exceeding the second threshold will switch the data selector 32 to the X0 (times zero) mode and will cause the Yh to be completely supressed. This corresponds to the introduction of a notch or low-pass filter in the analog designs, when comb failure is detected.

Motion Detection

As already described, the characteristics of the comb filter can be considerably enhanced by subsequent motion adaptive processing. In the PAL case, however, the detection of motion from the comb-filtered Y signal is made difficult in some situations by the presence of the alias components which tend to indicate the presence of motion in a stationary scene containing diagonal frequencies, because of the phase reversal of these components every two fields.

For the purpose of subsequent motion detection (in the above mentioned apparatus providing a four field frame store), an output of the Y1 signal is made available. When in the PAL mode, motion detection is carried out by analysis of the Y1, U and V data streams from all four stored fields as the data is being read out of the field store. Y1 values from two similar fields are compared (both pairs of fields are analysed) and the high-band part of the signal is analysed by comparing values of (U+V) or (U−V) from two similar picture lines. This quantity may be shown to be stationary in the general case of a stationary picture, the +/− decision being dependent on the state of the PAL switch in the lines in question.

Chrominance Comb-Filtering

As the intial application of this filtering system is to a device which has to incorporate a line interpolation system having access to four consecutive field lines, it is relatively straightforward to modify the chrominance interpolation system to provide chrominance signals which are free from cross-colour for vertical luminance frequencies (chrominance comb filtering).

Figure 2:
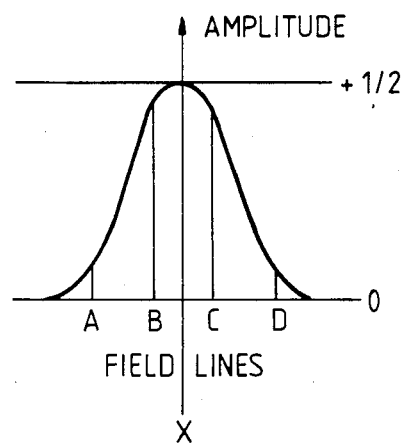
FIG. 2 shows a chrominance aperture function.

FIG. 2 shows the interpolation aperture applied to the U and V signals over four input lines to synthesise an output line at position X. Due to the symmetry of the function, it can be shown that without any further additions, NTSC comb filtering of the U and V signals is achieved by this function.

Figure 4:
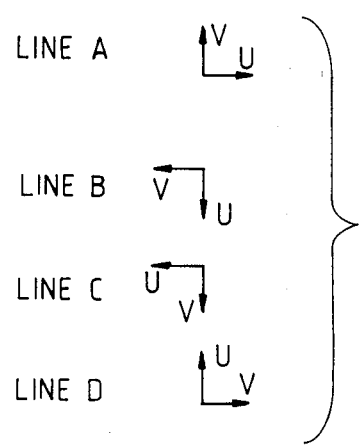
FIG. 4 illustrates a four line sequence of PAL chrominance signals.

PAL input, however, requires further processing due to the more complex sequence of U and V axis rotations from line to line (see FIG. 4 for a four-line PAL axis sequence diagram).

As a result of this sequence, the signals in the U and V channels produced by a highband luminance vertical frequency are generated with four different phases characteristic of the type of PAL line during which they were generated. For example, the signal produced in either channel during a Type A line is in antiphase with that produced in the same channel during a Type C line.

The net signal introduced into either channel can be seen to be dependent upon the difference between the interpolation coefficients assigned to the antiphase A and C lines and the antiphase B and D lines. It may also be seen that for each phase of crosstalk introduced into the U channel, there is another line where the same phase of crosstalk is being introduced into the V channel, this being either the line before or the line after (considering the A,B,C,D sequence to be continued). It follows that there is an aperture function which can easily be derived from the coefficients of the function in FIG. 2 which will cancel the cross-colour when applied to the four lines of the opposite channel, thereby introducing U-into-V and V-into-U crosstalk.

Figure 3:
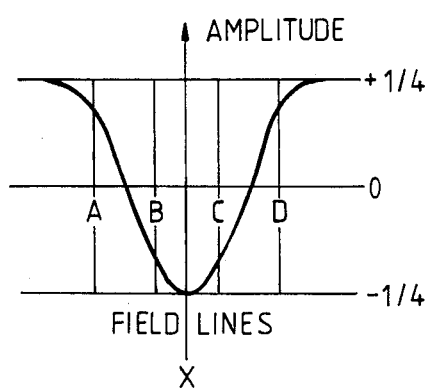
FIG. 3 illustrates chrominance cross-talk co-efficients.

The appropriate crosstalk aperture function for the arrangement of line coefficients shown in FIG. 2 and the four-line PAL sequence illustrated is shown in FIG. 3. Note that the average value of the coefficients is zero, so that there is no overall D.C. crosstalk between U and V channels, while the cancellation of Y-into-U and Y-into-V crosstalk (cross-colour) is effected by the difference between the coefficients assigned to the antiphase line pairs.

The crosstalk between U and V channels is easily introduced due to the fact that the U and V data are interleaved in a time-shared multiplex fashion in the same processing channel. The crosstalk is introduced only when there is a measurable difference between the Y1 samples and the corresponding comb-filtered wideband Y samples. In the case where the two sets of samples are either identical or very similar, the implication is that either the comb fail detector 34 has caused the data selector 32 to cut off Yh due to dissimilar chrominance information being present across the aperture, or that there is virtually no Yh present in the input signal. If the former is true, no U-into-V or V-into-U crosstalk is desirable; if the latter, none is necessary.

Alternative PAL luminance comb filter mode

It is possible to derive alternative expressions to be substituted in place of those shown for Yu and Yv, which retain the characteristic of rejecting consistent chrominance information, but are derived from the outer two lines of the three only. This substitution is made available as an alternative mode for PAL input, and corresponds to an equivalent two-line configuration in the coded signal domain. Although, by using this configuration, the luminance response is considerably degraded in that there is cancellation of certain diagonal frequencies, and other forms of distortion which are not present in the three-line case, this may be preferable to the incomplete cancellation of consistent chrominance which can occur due to differential phase distortion in the input signal when processed accordingly to the original system.

The expressions for Yu and Yv are modified as follows:

$$Yu=(U_{-1}-U_1)/2 \quad Yv=(V_{-1}-V_1)/2$$

The change may be implemented simply by disabling the sources of the centre line contributions Uo, Vo and inverting the sign of the $U_{-1}$ and $V_{-1}$ contributions. However, as the phases of the U and V axis components on the centre line are not consistent with the corresponding outer line phases, it also becomes necessary to advance the phase of the digital U and V reference sine wave generators by 90°, and invert the sense of the PAL switch signal feeding them.

This alternative process may be shown to be equivalent to a comb filter configuration in the coded signal domain wherein high-band luminance is derived from the averaged value of the two outer lines. As may easily be shown, this configuration produces no deviation from the original configuration when presented with vertical high frequencies (which are consistent from line to line), but as the high frequencies deviate from being vertical, cancellation will increasingly occur with a null present at 90° per line, and at greater deviations, the luminance high-band components reappear in inverted form. The amplitude vs angle from verticality function is a cosine, and for this reason, the equivalent 'coded domain' design is sometimes termed a 'two-line cosine comb filter'.

It is desirable, when using this configuration, to extend the adaptation function based on comb filter failure, to detect the occurrence of non-vertical high luminance frequencies which exceed the 90° per line null, so that inverted luminance is suppressed.

It is also particularly desirable that this be done in the case of PAL to NTSC conversion, as the maximum occurring at 180° per line corresponds exactly with the NTSC subcarrier to line phase relationship, and the presence of these luminance components, while not conveying any useful information, due to their inversion, does cause considerable cross-colour effects in the NTSC format.

In order to extend the failure detection system to take account of this requirement, the inputs to the digital L.P.F.'s (34) are processed prior to being input, by an arrangement which, in conjunction with the existing processing, allows the correllation of luminance signal phase across the three-line aperture to be assessed, and produces the control signals required by the data selector (32) to produce a smooth transition between the various attenuation levels, as already described.

The 'comb failure' adaptation logic in the original mode of operation has also been enhanced in that account is now taken of the outputs of unit (34) over several lines at the corresponding point in the line, in order to differentiate between inconsistent chrominance and high luminance frequencies which are close to the chrominance subcarrier frequency. This involves the addition of two further single-bit one line delays.

What is claimed is:

1. A video colour decoder using a digital comb filter, comprising
    first means for deriving a first analog signal Y1 representing low band luminance component of a video colour input signal Icv;
    second means for deriving a second analog signal Yhc representing high band luminance and chrominance components of the video colour input signal Icv;
    third means to enable synchronous demodulation of the second analog signal Yhc to provide a B-Y chrominance component signal $U_1$ and an R-Y chrominance component signal $V_1$ (where B and R is the conventional notation for the respective RGB component signals);
    first analog to digital converter (ADC) means for digitising the first analog signal Y1 to produce the equivalent digital signal Yd1;
    second analog to digital converter (ADC) means for digitising the (B-Y) and (R-Y) chrominance component signals $U_1V_1$;
    first digital delay means for providing a single line delay of the first digital signal Yd1;
    second digital delays means for providing a single line delay of the chrominance component signals $U_1V_1$ with a delay period of one line, the chrominance component signals so delayed by one line period being designated $U_0$, $V_0$;
    third digital delay means for providing a further single line delay of the chrominance signals $U_0,V_0$ with a further delay period of one line, the chrominance component signals so delayed by one further line period being designated $U_{-1}$, $V_{-1}$;
    summing means arranged to reject consistent chrominance information and operable to provide a high band luminance signal Yu as a function of at least two of the respective chrominance component signals $U_1$, $U_0$ and $U_{-1}$;
    summing means arranged to reject consistent chrominance information and operable to provide a high band luminance signal Yv as a function of at least two of the respective chrominance component signals $V_1$, $V_0$ and $V_{-1}$;
    means for generating digital sinewave and cosinewave reference signals Uref, Vref representing the sine wave of the coded (B-Y) subcarrier reference phase signal and the cosinewave of the coded (R-Y) subcarrier reference phase signal;
    digital means for obtaining the products of the signals Yu,Yv and their respective sinewave and cosinewave reference signals Uref, Vref;
    means for summing these products to provide a digital high band luminance component signal Yh;
    and digital means for summing the digital signal Yd1 and the digital signal Yh to provide a digital wide band luminance output signal Yd.

2. A video colour decoder as defined in claim 1, wherein said digital high band luminance signals (Yu,Yv) are obtained as a function of the respective chrominance component signals of three video lines represented by the undelayed chrominance components ($U_1$, $V_1$) the one line delayed chrominance components $U_0$, $V_0$ and the two line delayed chrominance components ($U_{-1}$, $V_{-1}$); said function requiring half the sum of the undelayed chrominance component signals ($U_1$, $V_1$) and the twice delayed chrominance component signals ($U_{-1}$, $V_{-1}$) to be subtracted from the once delayed chrominance component signals ($U_0$, $V_0$).

3. A video colour decoder as defined in claim 1 for receiving an input signal selected from the NTSC and PAL video signal systems, wherein said first and second means for deriving said first and second analog signals Y1 and Yhc are switchable for operation in the respective NTSC and PAL mode.

4. A video colour decoder as defined in claim 1, comprising an automatic gain control (AGC) loop with the third means and to provide signal scaling means (receiving a signal representing an inversion of gain in AGC loop) for scaling the digitised high band luminance frequency signal Yh.

5. A video colour decoder as defined in claim 1, comprising means for detecting residual chrominance components in the high band luminance signal Yh and comparing these residual components with two threshold levels, said detecting means being operable to generate a control signal for controlling a data selector, said data selector being capable of operation on the high band luminance signal Yh in one of three modes, said data selector being operable in a first said mode to pass this luminance signal, said data selector being operable in a second said mode to halve the amplitude of this luminance signal, said data selector being operable in said third said mode to suppress this luminance signal; said first mode corresponding to those residual components being below the first threshold, said second mode corresponding to those residual components being between the thresholds, and said third mode corresponding to those residual components being above the second threshold.

6. A video colour decoder as defined in claim 1, wherein said digital high band luminance signals (Yu,Yv) are obtained as a function of the respective chrominance component signals of two video lines represented by the undelayed chrominance components ($U_1$, $V_1$) and the two line delayed chrominance components ($U_{-1}$, $V_{-1}$); said function requiring half the difference of the twice delayed chrominance component signals ($U_{-1}$, $V_{-1}$) and the undelayed chrominance component signals ($U_1$, $V_1$).

7. A method of decoding a video colour signal to provide a digital wide band luminance signal comprising the steps of:
    (a) deriving a first analog signal Y1 representing low band luminance component of a video colour input signal Icv, by passing the video colour input signal Icv through a first analog filter means;
    (b) deriving a second analog signal Yhc representing high band luminance and chrominance components of the video colour input signal Icv by passing the colour input signal Icv through second means which subtracts the first analog signal Y1 from a correspondingly delayed input signal Icv;
    (c) synchronously demodulating the second analog signal Yhc to provide a (B-Y) chrominance component signal $U_1$ and an (R-Y) chrominance component signal $V_1$ (where B and R is the conventional notation for the respective RGB component signals);

(d) employing first analog to digital converter (ADC) means to digitise the first analog signal Y1 thereby to produce the equivalent digital signal Yd1;

(e) employing second analog to digital converter (ADC) means to digitise the (B-Y) and (R-Y) chrominance component signals $U_1$, $V_1$;

(f) employing first digital delay means to provide a single line delay of the first digital signal Yd1;

(g) employing digital delay means to provide a single line delay of the chrominance component signals $U_1$, $V_1$ with a delay period of one line, the chrominance component signals so delayed by one line period being designated $U_0, V_0$;

(h) employing third digital dealy means to provide a further single line delay of the chrominance signals $U_0, V_0$ with a further delay period of one line, the chrominance component signals so delayed by one further line period being designated $U_{-1}$, $V_{-1}$;

(i) employing summing means arranged to reject consistent chrominance information and operable to provide a high band luminance signal Yu as a function of at least two of the respective chrominance component signals $U_1$, $U_0$ and $U_{-1}$;

(j) employing summing means arranged to reject consistant chrominance information and operable to provide a high band luminance signal Yv as a function of at least two of the respective chrominance component signals $V_1, V_0$ and $V_{-1}$;

(k) generating digital sinewave and cosinewave reference signals Uref, Vref representing the sine wave of the coded (B-Y) subcarrier reference phase signal and the cosine wave of the coded (R-Y) subcarrier reference phase signal;

(l) obtaining the products of the signals Yu,Yv and their respective sinewave and cosinewave reference signals Uref,Vref;

(m) summing these products to provide a digital high band luminance component signal Yh;

(n) and, digitally summing the digital signal Yd1 and the digital signal Yh to provide a digital wide band luminance output signal Yd.

8. A decoding method as defined in claim 7, wherein in steps (i) and (j) said digital high band luminance signals (Yu,Yv) are obtained as a function of the respective chrominance component signals of three video lines represented by the undelayed chrominance component $(U_1, V_l)$ the one line delayed chrominance components $U_0$, $V_0$ and the two line delayed chrominance components $(U-_1, V-_1)$; said function requiring half the sum of the undelayed chrominance component signals $(U_1, V_1)$ and the twice delayed chrominance component signals $(U_{-1}, V_{-1})$ to be subtracted from the once delayed chrominance component signals $(U_0, V_0)$.

9. A decoding method as defined in claim 7, wherein in steps (i) and (j) said digital high band luminance signals (Yu,Yv) are obtained as a function of the respective chrominance component signals of two video lines represented by the undelayed chrominance components $(U_1,V_1)$ and the two line delayed chrominance components $(U_{-1},V_{-1})$; said function requiring half the difference of the twice delayed chrominance component signals $(U_{-1},V_{-1})$ and the undelayed chrominance component signals $(U_1,V_1)$.

* * * * *

UNITED STATES PATENT AND TRADEMARK OFFICE
CERTIFICATE OF CORRECTION

PATENT NO. : 4,766,484

DATED : August 23, 1988

INVENTOR(S) : John C. Clayton and Trevor J. Barnes

It is certified that error appears in the above-identified patent and that said Letters Patent is hereby corrected as shown below:

The title page showing the illustrative figure should be deleted to appear as per attached page.

On the title page, change the second sentence of the Abstract from "An analog signal V1..." to --An analog signal Y1...--.

In the specification, col. 1, lines 45 and 46, change "utlimately" to --ultimately--.

In the specification, col. 3, line 43, change "VO" to --Vo--.

In the specification, col. 3, line 51, change "Yu" to --Yv--.

In the specification, col. 8, line 67, change "Vre" to --Vref--.

In the specification, col. 9, line 36, change "of" to --or--.

In the specification, col. 13, line 1, change "Iine" to --line--.

Signed and Sealed this

Eleventh Day of April, 1989

Attest:

DONALD J. QUIGG

Attesting Officer

Commissioner of Patents and Trademarks

United States Patent [19]
Clayton et al.

[11] Patent Number: 4,766,484
[45] Date of Patent: Aug. 23, 1988

[54] NTSC/PAL SWITCHABLE VIDEO COLOR DECODER USING A DIGITAL COMB FILTER AND METHOD

[75] Inventors: John C. Clayton, Harrow Weald; Trevor J. Barnes, Woking, both of England

[73] Assignee: Avesco p.l.c., Chessington, England

[21] Appl. No.: 35,446

[22] Filed: Apr. 7, 1987

[30] Foreign Application Priority Data

Apr. 11, 1986 [GB] United Kingdom ............... 8608811

[51] Int. Cl.⁴ ........................... H04N 9/78; H04N 9/66
[52] U.S. Cl. ............................................. 358/23; 358/31
[58] Field of Search ........................... 358/21 R, 23, 31

[56] References Cited

U.S. PATENT DOCUMENTS

| | | | |
|---|---|---|---|
| 3,872,498 | 3/1975 | Pritchard | 358/31 |
| 4,050,084 | 9/1977 | Rossi | 358/31 |
| 4,241,363 | 12/1980 | Maeyama et al. | 358/31 |
| 4,464,675 | 8/1984 | Balaban et al. | 358/31 |

FOREIGN PATENT DOCUMENTS

| | | | |
|---|---|---|---|
| 117329 | 10/1978 | Japan | 358/31 |
| 94893 | 7/1981 | Japan | 358/31 |
| 158187 | 9/1984 | Japan | 358/31 |
| 74893 | 4/1985 | Japan | 358/23 |
| 96982 | 5/1985 | Japan | 358/23 |
| 2050110 | 12/1980 | United Kingdom | 358/31 |
| 2066615 | 7/1981 | United Kingdom | 358/31 |
| 1480516 | 7/1987 | United Kingdom | |

Primary Examiner—John W. Shepperd
Attorney, Agent, or Firm—Olson & Hierl

[57] ABSTRACT

Apparatus for and a method of decoding a video color signal provides a digital wide band luminance signal. An analog signal V1 representing the low band luminance component of a coded video color input signal Icv, is obtained at a first analog filter 1. An analog signal Yhc representing high band luminance and chrominance components is obtained at second means (5) which subtracts the first analog signal Y1 from a delayed input signal Icv. Signal Yhc is synchronously demodulated to provide (B-Y) and (R-Y) chrominance component signals $U_1$, $V_1$, which are digitized. Via digital delay means, single line delayed signals Yd1, $U_0$, $V_0$ and double line delayed signals $U_{-1}$, $V_{-1}$ are obtained. High band luminance signals Yu, Yv are then obtained as a function of at least two of the respective chrominance component signals $U_1$, $U_0$ and $U_{-1}$; and $V_{-1}$, $V_0$ and $V_{-1}$. These signals Yu, Yv are remodulated and combined to provide a digital high band luminance component signal Yh. Finally, by digitally summing the digital signals Yd1 and Yh a digital wide band luminance output signal Yd is obtained. Two different functions for obtaining the high band luminance components are exemplified. Wideband chrominance signals are also provided.

9 Claims, 2 Drawing Sheets

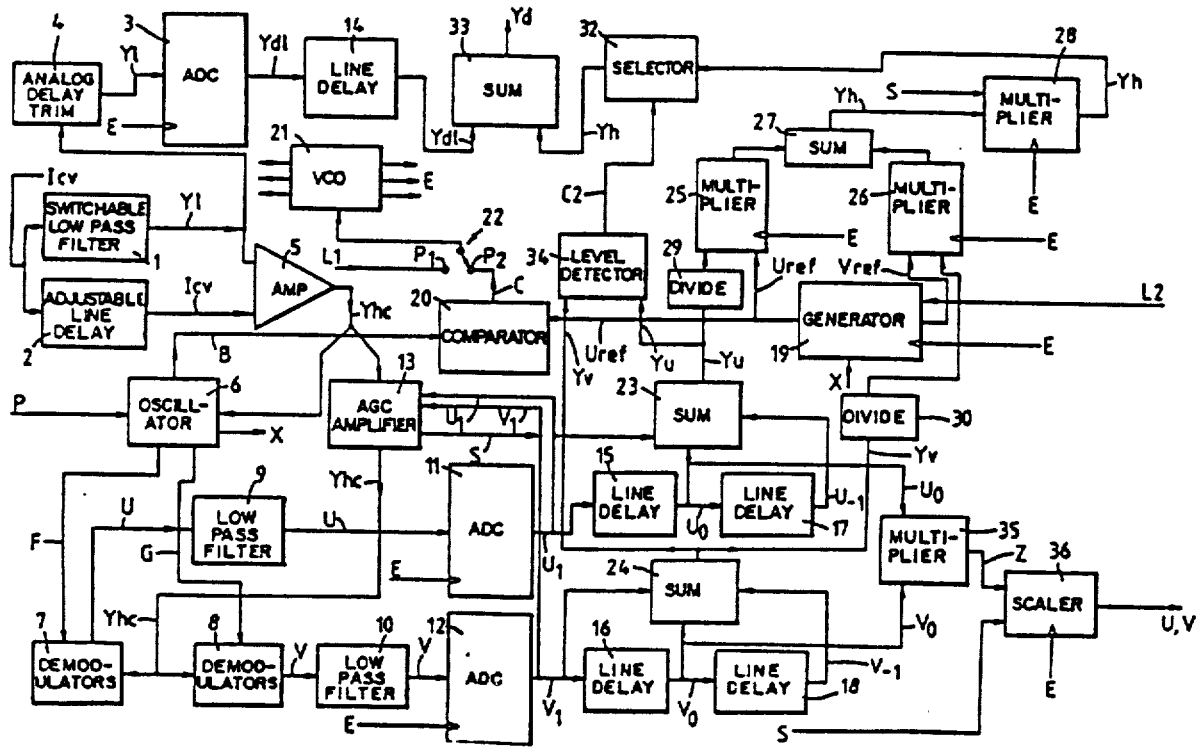

UNITED STATES PATENT AND TRADEMARK OFFICE
CERTIFICATE OF CORRECTION

PATENT NO. : 4,766,484

DATED : August 23, 1988

INVENTOR(S) : John C. Clayton and Trevor J. Barnes

It is certified that error appears in the above-identified patent and that said Letters Patent is hereby corrected as shown below:

FIG. 1, should appear as shown below:

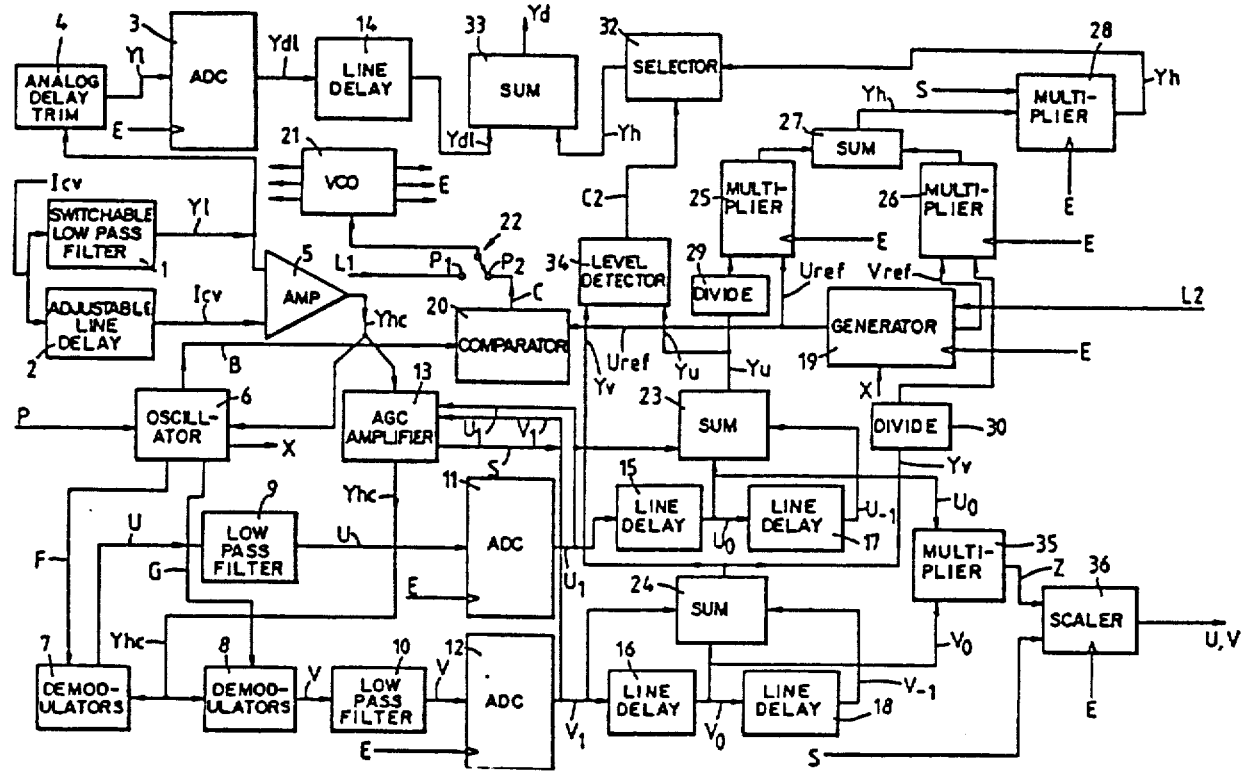

FIG. 1